(12) United States Patent
Bahr et al.

(10) Patent No.: US 9,246,159 B2
(45) Date of Patent: Jan. 26, 2016

(54) ELECTRODE FOR LITHIUM ION BATTERIES

(75) Inventors: Joerg Bahr, Altenholz (DE); Juergen Carstensen, Kiel (DE); Helmut Foell, Moenkeberg (DE); Oliver Riemenschneider, Kiel (DE); Hauke Hartz, Kiel (DE); Emmanuel Ossei-Wusu, Kiel (DE)

(73) Assignee: SAMSUNG ELECTRONICS CO., LTD. (KR)

( * ) Notice: Subject to any disclaimer, the term of this patent is extended or adjusted under 35 U.S.C. 154(b) by 430 days.

(21) Appl. No.: 13/388,263

(22) PCT Filed: Jul. 9, 2010

(86) PCT No.: PCT/DE2010/000799
§ 371 (c)(1),
(2), (4) Date: Mar. 16, 2012

(87) PCT Pub. No.: WO2011/015174
PCT Pub. Date: Feb. 10, 2011

(65) Prior Publication Data
US 2012/0164529 A1 Jun. 28, 2012

(30) Foreign Application Priority Data
Aug. 1, 2009 (DE) .......... 10 2009 035 745

(51) Int. Cl.
*H01M 4/64* (2006.01)
*C25D 7/12* (2006.01)
*H01M 4/66* (2006.01)
*B82Y 30/00* (2011.01)
(Continued)

(52) U.S. Cl.
CPC .......... *H01M 4/0438* (2013.01); *H01M 4/0492* (2013.01); *H01M 4/134* (2013.01); *H01M 4/1395* (2013.01); *H01M 4/661* (2013.01); *Y02E 60/122* (2013.01)

(58) Field of Classification Search
CPC . H01M 4/0438; H01M 4/0492; H01M 4/134; H01M 4/1395; H01M 4/661; Y02E 60/122
See application file for complete search history.

(56) References Cited

U.S. PATENT DOCUMENTS 6,383,923 B1 5/2002 Brown et al.
6,465,132 B1 * 10/2002 Jin .............................. 429/231.8
(Continued)

FOREIGN PATENT DOCUMENTS

CN 101107737 A 1/2008
CN 101302118 A 11/2008
(Continued)

OTHER PUBLICATIONS

C. Fang et al., "Deep Silicon Macropores Filled with Copper by Electrodeposition", Journal of the Electrochemical Society, 154(1) D45-D49 (2007).
(Continued)

*Primary Examiner* — Carlos Barcena
*Assistant Examiner* — Lilia V Nedialkova
(74) *Attorney, Agent, or Firm* — Cantor Colburn LLP (57) ABSTRACT

An electrode for lithium ion batteries, the electrode having a metal film which is inert to lithium ions and having a plurality of silicon nanowires protruding from the film, which are arranged on at least one flat side of the film, wherein sections of the nanowires are enclosed by the metal film.

4 Claims, 5 Drawing Sheets

(51) Int. Cl.
*H01M 4/04* (2006.01)
*H01M 4/134* (2010.01)
*H01M 4/1395* (2010.01)

(56) References Cited

U.S. PATENT DOCUMENTS

2009/0042102 A1    2/2009  Cui et al.
2010/0108132 A1*   5/2010  Tsakalakos et al. .......... 136/256
2010/0285358 A1*  11/2010  Cui et al. ................. 429/218.1

FOREIGN PATENT DOCUMENTS

CN    101486439 A     7/2009
EP    1 840 247 A2   10/2007

OTHER PUBLICATIONS

K. Peng et al., "Silicon nanowires for rechargeable lithium-ion battery anodes", Applied Physics Letters 93, 033105 (2008).
Peng K. et al.: "Ordered Silicon Nanowire Arrays via Nanosphere Lithography and Metal-Induced Etching"; Applied Physics Letters, American Institute of Physics, 90, 163123, Apr. 2007.
Peng K. et al.: "Fabrication of Single-Crystalline Silicon Nanowires by Scratching a Silicon Surface with Catalytic Metal Particles"; Advanced Functional Materials, Wiley, 16, 387-394, Feb. 2006.
Foll H. et al.: "Si Nanowire Arrays as Anodes in Li Ion Batteries"; Phys. Status Solidi RRL 4, No. 1-2, 4-6, (2010).
Lijuan Wan et al.: "Preparation and Surface Modification of Silicon Nanowires under Normal Conditions"; Applied Surface Science 254, 4899-4907, (2008).
Tao B. et al.: "Capacitive Humidity Sensors based on Ni/SiNWs Nanocomposites"; ; Sensors and Actuators B, 136, 144-150, (2009).
Chan et al.: "High-performance Lithium Battery Anodes using Silicon Nanowires"; Nature Publishing Group, nature nanotechnology, vol. 3, 31-35, Jan. 2008.
Van Kats et al.: "Synthesis of Monodisperse High-Aspect-Ratio Colloidal Silicon and Silica Rods"; American Chemical Society, Langmuir 2004, 20, 11201-11207.
The International Search Report issued during the International Phase of PCT/DE2010/000799 of which the instant application is the U.S. National Phase.
Peng, et al., Ordered silicon nanowire arrays via nanosphere lithography and metal-induced etching, Applied Physics Letters, 90, pp. 163123-1-163123-3 (2007).
Chinese Office Action with English Translation for Application No. 201080034248.X dated Dec. 10, 2013.
H. Foll et al., Si Nanowire Arrays as Anodes in Li Ion Batteries, rapid research letters, Oct. 20, 2009, pp. 1-3.
Japanese Patent Application No. 2012-521961, Non-Final Rejection w/English excerpt., Apr. 8, 2014.
K Peng et al., Ordered silicon nanowire arrays via nanosphere lithography and metal-induced etching, Applied Physics Letters 90, 163123, Apr. 20, 2007, pp. 1-3.

* cited by examiner

ELECTRODE FOR LITHIUM ION BATTERIES

This application is filed under 35 U.S.C. §371 as the U.S. National Stage of International Application PCT/DE2010/000799, filed Jul. 9, 2010, which claims priority of German Patent Application No. 10 2009 035 745.9, filed on Aug. 1, 2009, the contents of which are hereby incorporated by reference in their entirety.

FIELD OF THE INVENTION

The invention relates to an electrode for lithium ion batteries, the electrode having metal film which is inert to lithium ions and having a plurality of silicon nanowires protruding from the film, which are arranged on at least one flat face of the film.

BACKGROUND OF THE INVENTION

The performance of a rechargeable lithium ion battery (secondary battery or accumulator; these terms are used here as synonyms as is usual in the art, and hereinafter the term "battery" will often be used as an abbreviation) is measured as stored energy per mass (unit: mAhr/g) and depends on various factors.

It is a decisive parameter how much lithium can be intercalated into the two electrodes, anode and cathode, per gram of electrode mass. Other factors are the shelf life (lifetime of a non-loaded battery), the extent of self-discharge, the rate of recharging and the cycleability, i.e. no change in the charging capacity between repeated charging and discharging cycles should occur if possible. Last but not least, the manufacturing cost and consequently the price-performance ratio are to be kept within the scope of marketability.

Today's commercially available lithium ion batteries have to be still improved considerably in terms of their performance and price-performance ratio before a large-scale use in the field of energy becomes possible. Huge rising markets which generally require a considerably improved energy storage technology are e.g. accumulators for the "electric car" or for energy storage associated with alternative power generation.

WO 2007/027197 A2 deals with the problem to improve the cycleability of lithium ion batteries and proposes for this purpose a cathode comprising nanowires made of a lithium cobalt oxide, which stand upright on a metal film (formed of titanium and platinum here). The nanowires are formed by electrodeposition in pores of a porous aluminum oxide layer which is deposited especially as a template on the metal film. The template is then completely removed by etching with NaOH or KOH. On the metal film, a plurality of isolated upright nanowires (also referred to as "nanorods") remains, which have defined diameters and distances from each other. In other words, a nanorod array has been formed on the metal film.

The method of WO 2007/027197 A2 includes a number of depositing and patterning steps following the formation of the metal film, making the method very time-consuming and expensive. The nanowires are produced during the process and adhere directly on the metal film with one of their ends.

For the anode of a lithium ion battery, the paper by Chan et al. ("High-performance lithium battery anodes using silicon nanowires" Nature Nanotechnology 3, 31 (2008)) proposes that silicon nanowires should be arranged in an upright manner on a metal film (charge collector). It has been known for a long time that silicon, under formation of silicon-lithium compounds, can intercalate about 11 times more lithium per gram of silicon than a technically common graphite electrode. The capacitance of this anode exceeds 4000 mAhr/g which is even larger than that of metallic lithium. However, previous experiments for the use of silicon anodes have failed, because practically no cycleability was achieved. The reason for the extremely poor cycleability of silicon is its volume expansion involved in the intercalation of lithium by a factor of 4. The stresses occurring in this case are so large that the material is really powdered (degraded).

The paper by Chan et al indicates the fundamental solution to the problem: silicon nanowires are grown on e.g. a steel substrate by well-known techniques (here: liquid-vapor-solid method; LVS). The nanowires are flexible and can double their diameter without breaking. Nanopatterning of silicon increases the surface for receiving lithium ions, on the one hand, and makes place for preventing the above-mentioned stresses, on the other.

However, the anode of Chan et al is not yet ready for large-scale production. This is, above all, due to the manufacturing process which is complicated and expensive. The growth of the silicon nanowires by LVS methods requires gold particles as nucleation sites which remain on the tips of the nanowires. The nanowires themselves are saturated with gold, making the production of thicker wires or on larger areas very costly. In addition, the nanowires obtained are not homogeneous. There are thick and thin, long and short, upright and bent nanowires and nanowires securely attached to the substrate and nanowires detaching from it.

Silicon nanowires which are not contacted with the metal film are particularly undesirable in large-scale manufacture. They do not contribute anything to the ampere-hour capacity of the battery, but when the battery is charged for the first time, they absorb lithium ions which cannot be extracted (irreversible capacity). And of course, they also are saturated with gold in the method by Chan et al.

In particular the cycleability of the silicon-nanowire anode according to Chan et al is not too good as recent results reveal (ECS Conference, San Francisco, May 2009). The electrical connection degrades with the number of charging and discharging cycles. The volume expansion of silicon seems to result at least in stresses in the area of the contact point on the metal film where the silicon nanowires adhere. Chan et al write the following about their nanowires: "They also appeared to remain in contact with the current collector, suggesting minimal capacity fade due to electrically disconnected material during cycling." (Nature Nanotechnology 3, 31 (2008)). This implies that nanowires detach during the cycles at least in a small number. However, an optimum electrical connection requires that each nanowire is connected to, and above all is kept connected to, the current-collecting electrode at a low resistance.

Silicon-nanorod arrays are known in the state of the art also from a completely different technical field, that is, electrochemical pore etching in semiconductor wafers.

It is, for example, apparent from the paper by van Katz et al ("Synthesis of Monodisperse High-Aspect-Ratio Colloidal Silicon and Silica Rods", Langmuir 2004, 20, 11201-11207), that the pore diameter of p-type silicon can be varied by changing the etching current. From given current intensities, the pores begin to overlap (overetching the pores), i.e. the pore space generated is connected throughout the etched region of the wafer. Only remains of the original pore walls are left and these protrude from the wafer as isolated rods. Van Katz et al then break off the nanorods by rinsing with water or ethanol.

Noteworthy here is the contrast to the nanorods from the paper by Chan et al: Due to the homogeneity of the etching process, all rods are practically the same in terms of length, diameter and even cross-sectional shape. They are made of pure silicon (without any additions such as gold or the like) and are also identical in terms of their material structure, as they are formed from the same wafer.

However, the silicon wafer provided with nanorods by etching is not suited as an anode of a lithium ion battery, as lithium ions would also penetrate into the wafer and would degrade it, which would result in the detachment of all nanowires. In addition, silicon itself is not a good conductor and hence the wafer is not a good charge collector.

BRIEF SUMMARY OF THE INVENTION

It is the object of the invention to propose an electrode for a lithium ion battery, specifically an anode, which overcomes the disadvantages of the state of the art and in particular exhibits an excellent cycleability.

The object is solved by an electrode with the feature of claim 1. The dependent claims 2 through 6 relate to advantageous embodiments of the electrode. Independent claim 7 is directed to a method for manufacturing an electrode according to claim 1. Dependent claims 8 and 9 further develop the method according to claim 7.

The electrode according to the invention consists in a metal film which is inert to lithium ions, and a plurality of silicon nanowires protruding from the film, which are arranged on at least one flat face of the film, sections of the nanowires being enclosed by the metal film. According to the invention, the nanowires do not (as is the case in the state of the art) only adhere to the surface of the metal film but they are embedded therein, comparable to anchoring piers to the ground. In a preferred embodiment of the electrode, sections of the nanowires penetrate the entire metal film from one flat side to the other.

Preferably, at least those sections of the nanowires which are enclosed by the metal are regularly arranged in the interior of the metal film. Those sections of the nanowires which protrude from one flat side of the metal film are therefore regularly arranged also in the proximity to the film, but at a larger distance from the metal film, they can group to form tufts and can tilt over. This depends on the length P of the nanowires in relation to the thickness D of the metal film, amongst other things, the length of the sections of the nanowires, which are enclosed by the metal, preferably being also D. The length of the protruding sections, which is P-D, is preferably set to be larger than D.

The metal film should be made of a metal which is inert to lithium ions. This means that chemical reactions of the ions with the metal shall not take place, and the lithium ions shall not be intercalated into the metal either. The metal film is preferably made of a noble metal such as copper, silver, gold, platinum or titanium. A copper film is particularly suitable.

It is also possible to provide the metal film with an additional passivating layer. This layer does not interrupt the electrical contact between silicon nanowires and the metal film, as this contact occurs mainly in the interior of the metal film.

The method for manufacturing the electrode described above is based on an array of silicon nanowires standing upright on a silicon wafer, the array being formed by first electrochemical pore etching and subsequent overetching the pores by the remains of the pore walls. The silicon wafer is preferably made of p-type silicon. The method further provides the electrodeposition of metal from a metal coagulant solution on the wafer. In this case, the metal forms only on the surface of the wafer and encloses the nanowires protruding from the surface. On the nanowires themselves, no metal is deposited because of the insufficient space-charge region. The electrodeposition is finished as soon as the desired thickness of the metal film has been reached. The metal film can be electrically contacted and forms, with the silicon nanowires protruding from that side of the metal film which is opposite to the wafer, the electrode according to the present invention.

It is advantageous to form the metal film so thick that it can be detached from the wafer. The detachment can be done, for example, by heating the wafer provided with the metal film. The differences in the thermal expansion of metal and silicon cause stresses which do not only overcome the adherence of the metal film to the surface of the wafer but also detach from the wafer the nanowires enclosed by the metal. The electrode is then a flexible metal foil with silicon nanowires which protrude from one flat side of the foil but otherwise completely penetrate the foil.

The detachment of the metal film from the wafer still requires some optimizations in terms of controllability but it can be seen that the detachment is particularly easy in the case of a copper film. This and other details of the manufacturing method as well as of the capacitance and cycleability of the electrode will be described hereafter in further detail with reference to the drawings.

DETAILED DESCRIPTION OF THE INVENTION

Figure 1:
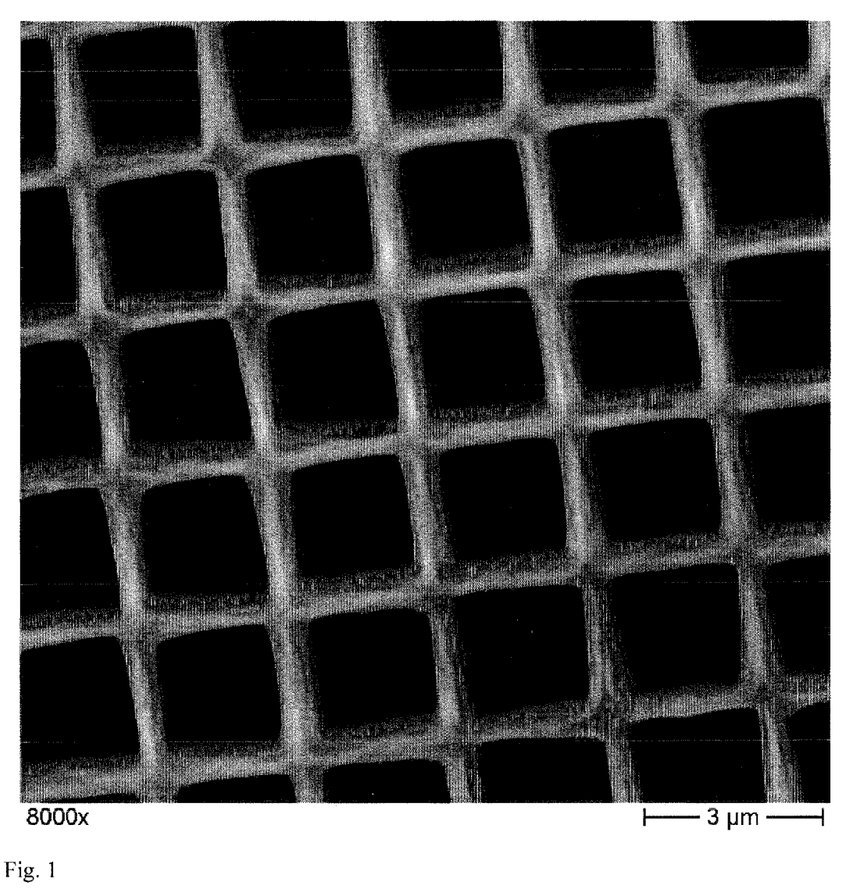
FIG. 1 illustrates the top view of a p-type silicon wafer provided with macropores having a diameter of about 1.6 µm.

FIG. 1 shows the result of an electrochemical etching process which is known per se. Preferably, lithographically pre-patterned p-type silicon wafers are used, the pore nuclei having a (rather unusual) arrangement in a square lattice. In this case, the lithographic process is not sophisticated. The arrangement of the pore nuclei in a square lattice is not essential but is preferable, as thereby thicker nanowires having an almost square cross-section can be formed. Macropores can be formed even better in n-type silicon. However, etching of n-type silicon requires an illumination of the backside of the wafer and a much more time-consuming and costly, but mastered, process control. The type of doping of silicon is irrelevant to its use as a battery electrode.

Embodiment 1

Macropores in P-Type Silicon which are Obtained by Etching a Silicon Wafer Specimen The specimen is galvanostatically etched at 5 mA in an electrochemical etching cell for 2 minutes. In this case, the electrolyte is made up of 5% by weight HF in pure dimethyl formamide (DMF). Five minutes later, the current increases linearly from 5 mA to 25 mA. Another 105 later, the current decreases from 25 mA to 10 mA.

Figure 2:
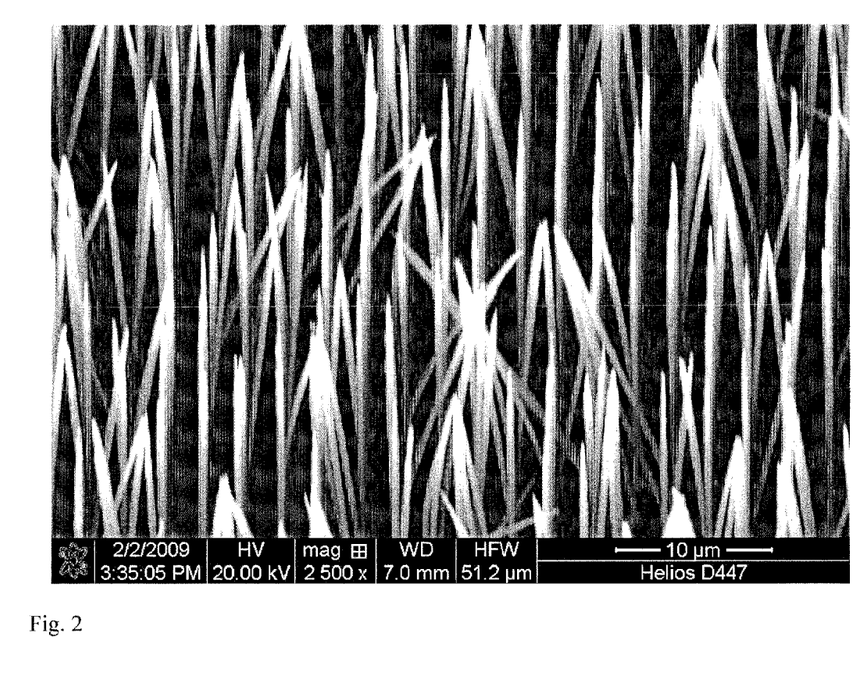
FIG. 2 illustrates the wafer of FIG. 1 after the pores have been chemically overetched, the wafer now comprising protruding nanowires (diameter: approx. 350 nm), which are the remains of the original pore walls. In the background of the photograph, the wafer can be seen.
Figure 3:
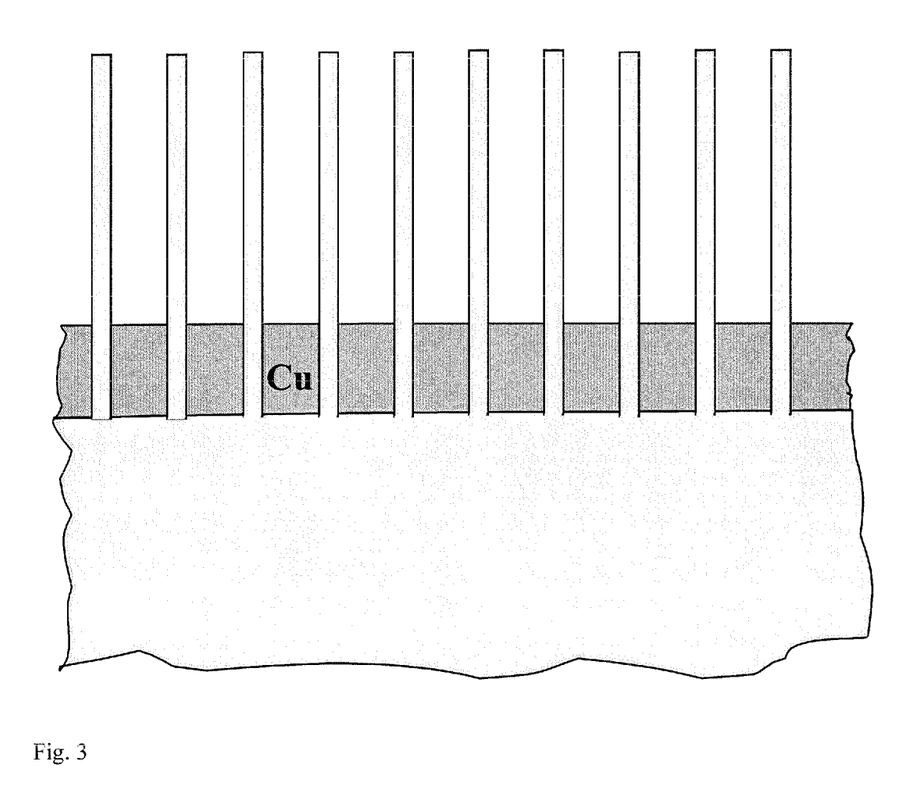
FIG. 3 is a schematic view of the cross-section of the wafer of FIG. 2, on which a metal layer has been deposited additionally.
Figure 4:
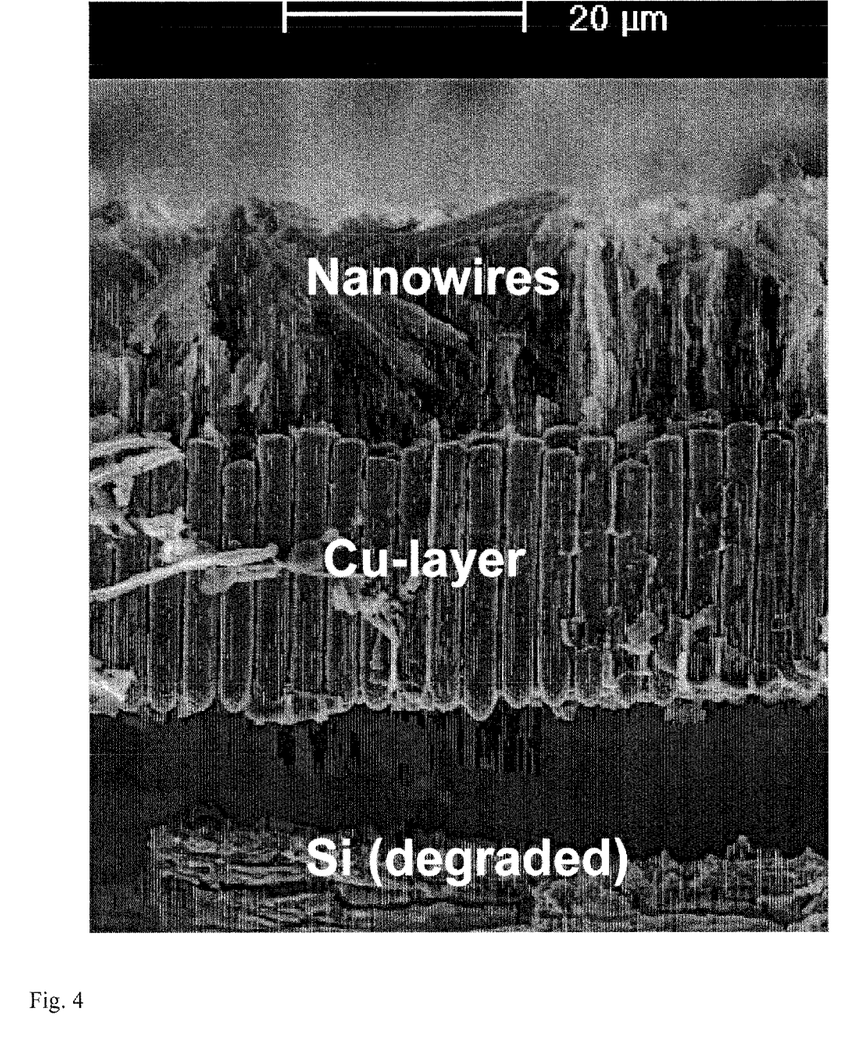
FIG. 4 is an electron micrograph of a cross-section of the wafer including the metal film and nanowires, each of the nanowires comprising a section enclosed by the metal film and a section protruding from the top surface of the metal film. In the area of the micrograph, the metal film has detached from the wafer, in the course of which the nanowires were torn off.

Pieces of approx. 1 cm$^2$ are prepared as test electrodes from the wafer. For the test electrodes, pores having a depth of 160 μm and a diameter of about 1.6 μm are formed. In contrast, FIGS. 2 through 4 show examples in which the pore depth is only 55 μm. According to the state of the art, pore depth, arrangement, diameter and shape of the pores can be varied within large ranges, even though not all of them can be varied independently of each other.

Nanowires are formed in the silicon wafer by overetching the macropores formed at first. This overetching may be done electrochemically (cf. van Katz et al) or wet chemically and is also known per se to those skilled in the art. In the overetching process, the walls of the pores are dissolved slowly. This is done isotropically, i.e. uniformly in all directions. In order to form a nanowire in the middle between four pores, the ratio of the pore distance to the pore diameter should be particularly preferably selected to be 2:1.

Embodiment 2

Overetching of the Macropores

The specimens prepared from the porous wafer are humidified with an etching solution of the following composition:

| Chemical | 48% HF | 65% HNO$_3$ | 99% ethanol | 96% CH$_3$COOH |
|---|---|---|---|---|
| Mixture, % by vol. | 6% | 16% | 30% | 48% |

The active (oxidizing) component in the solution is nitrous acid (HNO$_2$), which is always present at equilibrium with nitric acid (HNO$_3$). In order to additionally activate the solution, a lump of silicon is dissolved in the solution prior to the actual etching process. Due to the reaction, the equilibrium is shifted towards HNO$_2$, whereby subsequent etching of the porous specimen proceeds more efficiently (faster). In such an activated solution, the specimen is etched at a constant temperature of 19° C. for 20 to 24 hours.

The result is nanowires standing freely on the wafer, which consist of the remains of the pore walls. An example of this is the electron micrograph shown in FIG. 2.

The geometry of the nanowires results from the crystal structure of silicon. After the nanowires have been loaded with lithium for the first time, the nanowires get amorphous. The external habit is then optimized according to other parameters and the nanowires take a circular (cylindrical) shape.

The most important step for manufacturing the electrode for lithium ion batteries is now the electrodeposition of a metal which is inert to lithium ions, preferably copper, on the wafer having the silicon-nanorod array. Copper is not only inert to lithium but it is also the preferred material of the electrical connection. The target structure is schematically illustrated in FIG. 3.

During the electrodeposition of the metal, the nanowires themselves are intended to be covered by the metal as little as possible. The nanowires (p-type silicon) produced by the process described above are electrically insulating, as they include only one space-charge region when a voltage is applied. Therefore, no current flows through the nanowires during the electrodeposition and no material is deposited on the nanowires.

Should the silicon nanowires have a higher conductivity after the manufacturing process—e.g. because they have been formed from n-type silicon—then they might be additionally redoped after the etching process to prevent metal from being deposited in the nanowires.

The electrodeposited metal film is formed directly on the surface of the wafer in the region of the former pore tips (hence on the bases of the nanowires). The film thickness increases with the duration of electrodeposition and the film encloses a section of each nanowire, the length of the enclosed section increasing with the film thickness. Finally, a metal film is obtained which comprises silicon nanowires protruding from one flat side, each of which having sections enclosed by the metal film. The nanowires are practically anchored to the metal film. This anchoring is strong enough for the metal film to tear off the nanowires from the wafer when the metal film is detached from the substrate, which can easily be seen in FIG. 4.

Embodiment 3

Electrodeposition of Copper on an Etched Silicon Wafer

A copper film is formed by electroplating the etched wafer provided with a nanorod array at about 20° C. and a constant deposition potential of −0.5 V in relation to platinum for about 20 hours. The salt solution has the following composition:

| Composition (ml or g) | | | | | |
|---|---|---|---|---|---|
| H$_2$O | H$_2$SO$_4$ | CuSO$_4$ | PEG | DTAC | SPC |
| 300 ml | 70 ml | 5 g | 0.1 g | 0.1 g | 0.1 g |

DTAC: 1-(dodecyl) trimethyl ammonium chloride
SPC: bis(3-sulfopropyl) disulfide
PEG: poly(ethylene glycol)

The copper film should have a thickness of at least 1 μm, preferably several ten micrometers. If the length of the nanowires is large enough, the film thickness may even be several hundred micrometers. The sections of the nanowires which protrude from the metal film should have a length of at least 5 μm.

FIG. 4 illustrates a cross-section of a copper film having a thickness of about 20 μm, which was electrodeposited on the wafer provided with a nanorod array obtained by etching. The copper layer detaches from the silicon wafer by annealing, for about 60 minutes, the copper-plated specimens at a temperature slightly exceeding 100° C. The lines running regularly parallel within the copper foil (in the middle of the photograph) are the sections of the nanowires enclosed by the copper film, which protrude from the top surface of the film. At the lower margin of FIG. 4, remains of the silicon wafer can be seen, which obviously have come into contact with lithium ions during the charge cycles (described below) due to cracks in the film and have been degraded thereby.

The detached copper film including nanowires is flexible and is, in principle, very easy to contact on the back surface. On the other hand, the presence of the silicon wafer is irrelevant to the function of the metal film as an electrode. Therefore, the wafer can be removed and can even be reused for the further production.

However, it may be easier in practice to leave the wafer as a substrate of the metal film, as the detachment of the metal film is, of course, accompanied by an action of forces on the film, which might damage the nanopatterns. The optimization of the detachment of the metal film is a separate problem and it is not intended here to go into this problem.

The properties of the metal film including nanowires as an electrode of a lithium ion battery are explained with reference to FIGS. 5 and 6.

Figure 5:
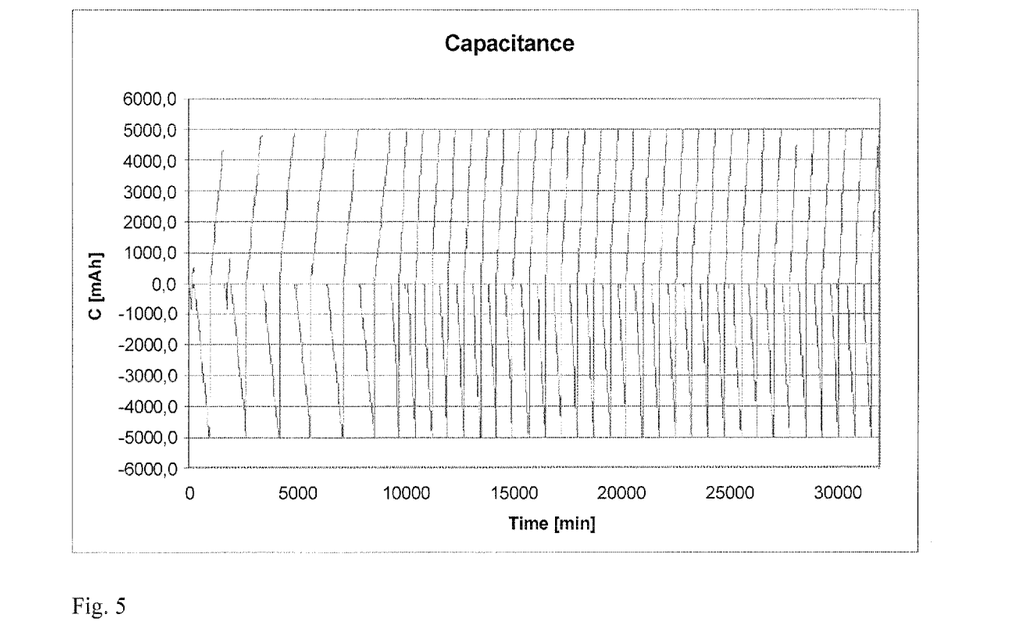
FIG. 5 is a graphic representation of the measured charge which is fed into the electrode and is redrawn from it (charge cycle). No significant decrease in the charging capacity can be seen over the almost 40 charge cycles shown.

In FIG. 5, the measured charge is shown, which is fed (negative) into the electrode and is redrawn (positive) in successive charging and discharging cycles, a single cycle lasting for more than 12 hours. The measurements are performed in a conventional half-cell for battery research, which has a reference electrode of $Li/Li^+$ metal, a separator of glass fleece and 0.5 ml of electrolyte. The electrolyte is made up of dimethyl carbonate and ethylene carbonate in the ratio of 1:1 plus one mole of the supporting electrolyte $LiPF_6$. The opposite electrode to be tested, which is the silicon-nanowire anode in this case, is arranged together with an additional copper ring on the edge of the specimen in the half-cell. In this way, the metal film is contacted from the front side so that it need not be detached from the wafer.

The data of the circular test electrodes each having a diameter of about 8 mm are as follows: Nanowire diameter: 0.75 µm, nanowire length: 160 µm, thickness of the copper layer: 20 µm, number of the nanowires: approx. 6.646 million, calculated weight of the nanowires: 1.2 mg, theoretical charge: 5.12 mAhr, measured charge: 5.045 mAhr.

Thus, the realized capacitance of the electrodes almost reaches the theoretical maximum of 4200 mAhr/g, which is in fact about 11 times the capacitance of a usual graphite electrode of today.

It is clearly visible in FIG. 5 that the charging capacity is of an excellent stability after the first two cycles. In the initial cycles, lithium ions are intercalated into the nanowires made up of pure silicon and these lithium ions can not be extracted (irreversible capacity), which is a well-known and inevitable phenomenon. The effective irreversible capacity, which is 12% here, is, however, actually within the range of the theoretically possible minimum.

Figure 6:
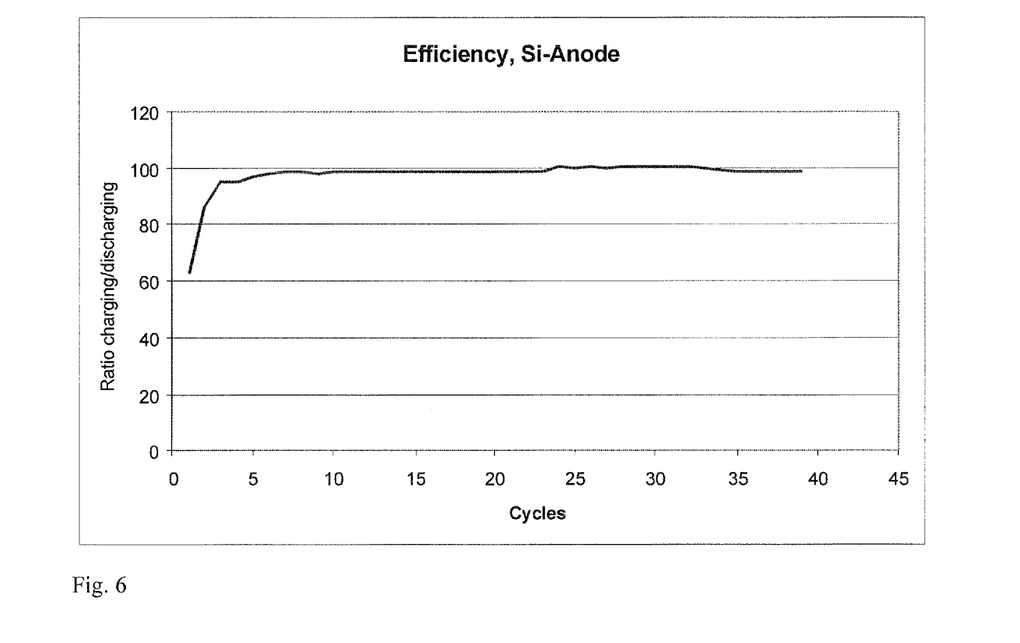
FIG. 6 is a plot of the ratio of the energy drawn to the energy fed. Taking the measuring accuracy into account, the efficiency will be practically 100% as soon as the initial losses of lithium ions (irreversible capacity) have occurred.

In FIG. 6, the ratio of the power drawn to the power fed over almost 40 cycles is shown. Taking the measuring accuracy into account, the efficiency is 100%. After 40 charging and discharging cycles, a degradation or ageing of the electrode can not yet be observed. Therefore, there is a realistic chance to reach a number of cycles of 500 and over, which is required on the market.

Anchoring the nanowires to the metal film is regarded as the main reason for the excellent properties of the electrode. Apparently, practically no nanowires detach from the film despite their repeated expansion to the four-fold volume by the intercalation of the lithium ions. The expansion probably does not take place in the interior of the metal film, as otherwise an expansion of the channels in the metal, in which the nanowires are seated, would presumably be visible, as an irreversible deformation of the metal should be assumed. The lithium ions probably just do not reach the metal film, and tearing off the sections (expanded outside the metal film and not expanded inside it) from each other obviously requires larger mechanical forces.

In addition, it should be emphasized that the respective steps of the manufacturing method described above are well-controlled processes in which countless approaches for further optimizations result from technical competence. Particularly in electrodeposition, the search for useful process parameters allows considerably shorter process times to be expected. In contrast, the acceleration of the time characteristic of the etching processes is limited, but what matters here is the quality of patterning and the uniformity of the pores and of the nanorod arrays.

In terms of homogeneity and controllability of the nanowire arrays produced, pore etching together with subsequent overetching of the wafer is clearly superior to the assembling procedures (e.g. LVS) which are difficult to control. In addition, the selection of the nanowire diameter is not limited to the usual range of about 100 nm, but very much thicker microwires can be formed in the same way. In the context of the present invention, the term "silicon nanowire" is intended to also include silicon wires having a diameter up to 10 µm.

At present, the technology of electrochemical pore etching is on the point of becoming a commercialized standard method for which the computer-controlled hi tech equipment is already available on the market. It is therefore expected that a battery electrode of the type described above will be offered at a reasonable price in the foreseeable future.

The metal film including the silicon nanowires anchored thereto, which protrude from one flat side of the film, is as such a novel structure, at least in the field of battery electrodes. It cannot be produced by any method used so far for the manufacture of silicon-nanowire electrodes.

The above-described method based on overetched silicon wafers allows both the regular arrangement of the nanowires in the interior of the metal film and the maximum possible anchoring in the sense that the nanowires completely pass through the metal film from one flat side to the other, that is, they penetrate into the film to the maximum depth.

The mechanical stabilization of the nanowires by the sections embedded in the metal film is reported here for the first time and seems to fundamentally solve the problem of the cycleability of silicon-nanowire electrodes.

What is claimed is:

1. An electrode for lithium ion batteries, the electrode being used in a lithium ion battery and having a metal film which is inert to lithium ions and having a plurality of silicon nanowires protruding from the metal film, which are arranged on at least one flat side of the metal film, wherein sections of the nanowires are enclosed by the metal film and where the nanowires extend through an entire thickness of the metal film and are anchored in the metal film; where the metal film is formed from an elemental metal selected from the group consisting of copper, platinum and titanium; wherein the metal film has a thickness of at least 1 micrometer.

2. The electrode according to claim 1, comprising a regular arrangement of at least those sections of the silicon nanowires which are enclosed by the metal film.

3. The electrode according to any one of the preceding claims, wherein those sections of the silicon nanowires which are enclosed by the metal film pass through the entire film thickness.

4. The electrode according to any one of the preceding claims, wherein the silicon nanowires protruding from the metal film have a length of at least 5 micrometers.

* * * * *